US007864066B2

(12) United States Patent
Kriel et al.

(10) Patent No.: US 7,864,066 B2
(45) Date of Patent: Jan. 4, 2011

(54) AUTOMATED LOST LOAD RESPONSE SYSTEM

(75) Inventors: Bradley Scott Kriel, Peoria, IL (US); Adam J. Gudat, Chillicothe, IL (US); Kenneth L. Stratton, Dunlap, IL (US)

(73) Assignee: Caterpillar Inc, Peoria, IL (US)

( * ) Notice: Subject to any disclaimer, the term of this patent is extended or adjusted under 35 U.S.C. 154(b) by 727 days.

(21) Appl. No.: 11/819,782

(22) Filed: Jun. 29, 2007

(65) Prior Publication Data

US 2009/0002187 A1    Jan. 1, 2009

(51) Int. Cl.
*G08B 21/00*    (2006.01)
(52) U.S. Cl. ................ 340/673; 340/603; 340/605
(58) Field of Classification Search ........... 340/665, 340/673, 679, 603, 605, 606, 612, 617, 616, 340/619; 73/760, 40, 305, 313; 137/15.11
See application file for complete search history.

(56) References Cited

U.S. PATENT DOCUMENTS

| | | | | |
|---|---|---|---|---|
| 3,768,087 A * | 10/1973 | Kaye et al. | ............. | 340/545.2 |
| 4,404,843 A * | 9/1983 | Johnson et al. | ............. | 73/49.2 |
| 4,697,173 A | 9/1987 | Stokes | | |
| 4,749,273 A | 6/1988 | Reinhold | | |
| 4,750,197 A * | 6/1988 | Denekamp et al. | ....... | 455/404.2 |
| 5,063,729 A | 11/1991 | Fox et al. | | |
| 5,347,274 A * | 9/1994 | Hassett | ...................... | 340/988 |
| 5,456,102 A | 10/1995 | Moorehead | | |
| 5,719,771 A * | 2/1998 | Buck et al. | ............... | 455/456.5 |
| 5,903,355 A | 5/1999 | Schwarz | | |
| 5,969,595 A | 10/1999 | Schipper et al. | | |
| 6,154,658 A * | 11/2000 | Caci | .......................... | 455/466 |
| 6,598,930 B1 * | 7/2003 | Tilton | ................... | 296/100.06 |
| 7,082,828 B1 | 8/2006 | Wilkins | | |
| 7,113,852 B2 | 9/2006 | Kapadia et al. | | |
| 7,394,363 B1 * | 7/2008 | Ghahramani | ........... | 340/539.22 |
| 7,482,924 B1 * | 1/2009 | Beinhocker | ................ | 340/555 |
| 7,646,301 B2 * | 1/2010 | Waterhouse et al. | ..... | 340/572.1 |
| 2003/0217870 A1 | 11/2003 | Ridling | | |
| 2004/0100378 A1 * | 5/2004 | Hollnagel | ............. | 340/539.17 |
| 2005/0219042 A1 * | 10/2005 | Thomson | ................ | 340/426.1 |
| 2006/0032492 A1 | 2/2006 | Bagwell et al. | | |
| 2006/0220842 A1 * | 10/2006 | Breed | .................... | 340/539.13 |

FOREIGN PATENT DOCUMENTS

EP            0347223          12/1989
JP         2005018472 A  *   1/2005

* cited by examiner

*Primary Examiner*—George A Bugg
*Assistant Examiner*—Kerri McNally
(74) *Attorney, Agent, or Firm*—Finnegan, Henderson, Farabow, Garrett & Dunner LLC

(57) ABSTRACT

An automated lost load response system for work machines is disclosed. The response system has a container supported by the machine to retain material. It also has a sensor situated to detect material lost from the container. The sensor generates a signal corresponding to detection of material lost. Additionally, the response system has a controller that is in communication with the sensor. The controller is configured to provide a load loss warning based on the signal generated by the sensor.

20 Claims, 2 Drawing Sheets

AUTOMATED LOST LOAD RESPONSE SYSTEM

TECHNICAL FIELD

The present disclosure relates generally to an automated load response system and, more particularly, to a system for automatically determining when a machine has lost a load, and then responding accordingly.

BACKGROUND

Machines such as, for example, on and off-highway haul trucks, ships, railway cars, and other types of heavy equipment are used to perform a variety of tasks. Some of these tasks involve carrying large, awkward, loose, and/or heavy loads and, because of the size of the machines and/or poor visibility provided to operators of the machines, these tasks can be difficult to complete safely and effectively. In fact, it is not uncommon for part of the load to fall from the machine completely unnoticed by the operator. This problem can be exacerbated when the machine is remotely or autonomously controlled. A lost load can result in low productivity and efficiency, as well as potential obstruction and/or contamination of roadways, railways, or waterways. The lost load can also damage other machines and harm living organisms in the immediate vicinity.

One way to minimize the affect of a lost load may be to automatically detect when and how much of the load has been lost from the machine, and provide this information to an operator of the machine. An example of this strategy is described in U.S. Pat. No. 7,113,852 (the '852 patent) issued to Kapadia et al. on Sep. 26, 2006. The '852 patent describes a ship or other watercraft equipped with a hull integrity detector and a sensor. Once a breach in a cargo hull of the ship has been detected by the hull integrity detector, the sensor detects an egress rate of cargo through the breached hull. The sensor may operate in combination with an algorithm that determines the amount of cargo leaving the hull of the ship based on sensed changes in water displacement of the vessel and known dimensions, and configurations of the vessel.

Although the hull integrity detector of the '852 patent may alert a ship or watercraft operator to a potential cargo loss when a container is ruptured, it may do little to alert a machine operator to cargo lost via intended container openings, for example, the open top of a haul truck, the open door of a container, and the open sides of a barge. Furthermore, though the sensor of the '852 patent may determine the amount of cargo leaving a ruptured hull, it may have limited applicability to non-watercraft because the determination relies on changes in a vessel's water displacement. Reliance on a vessel's water displacement may also be an inaccurate method of determining the amount of cargo lost because additional factors not accounted for by the '852 patent may affect buoyancy. For example, while cargo is flowing out, water may flow in, and while cargo is flowing out, other materials may be dumped from the vessel to alleviate listing. In addition, the system of the '852 patent may provide little warning to avoid the geographical location of the lost load, or arrange for cleanup, salvage, or repair necessitated by the lost load.

The disclosed system is directed to overcoming one or more of the problems set forth above.

SUMMARY OF THE INVENTION

In one aspect, the present disclosure is directed to an automated lost load response system for a machine. The response system includes a container supported by the machine to retain material. The response system also includes a sensor situated to detect material lost from the container. The sensor generates a signal corresponding to its detection of material lost. Additionally, the response system includes a controller that is in communication with the sensor. The controller is configured to provide a load loss warning based on the signal.

In yet another aspect, the present disclosure is directed to a method of responding to a load lost from a machine. The method includes emitting a detection beam. The method also includes detecting an irregular reflection of the beam, the detection being used to determine whether the machine has lost at least a portion of its load.

DETAILED DESCRIPTION

Figure 1:
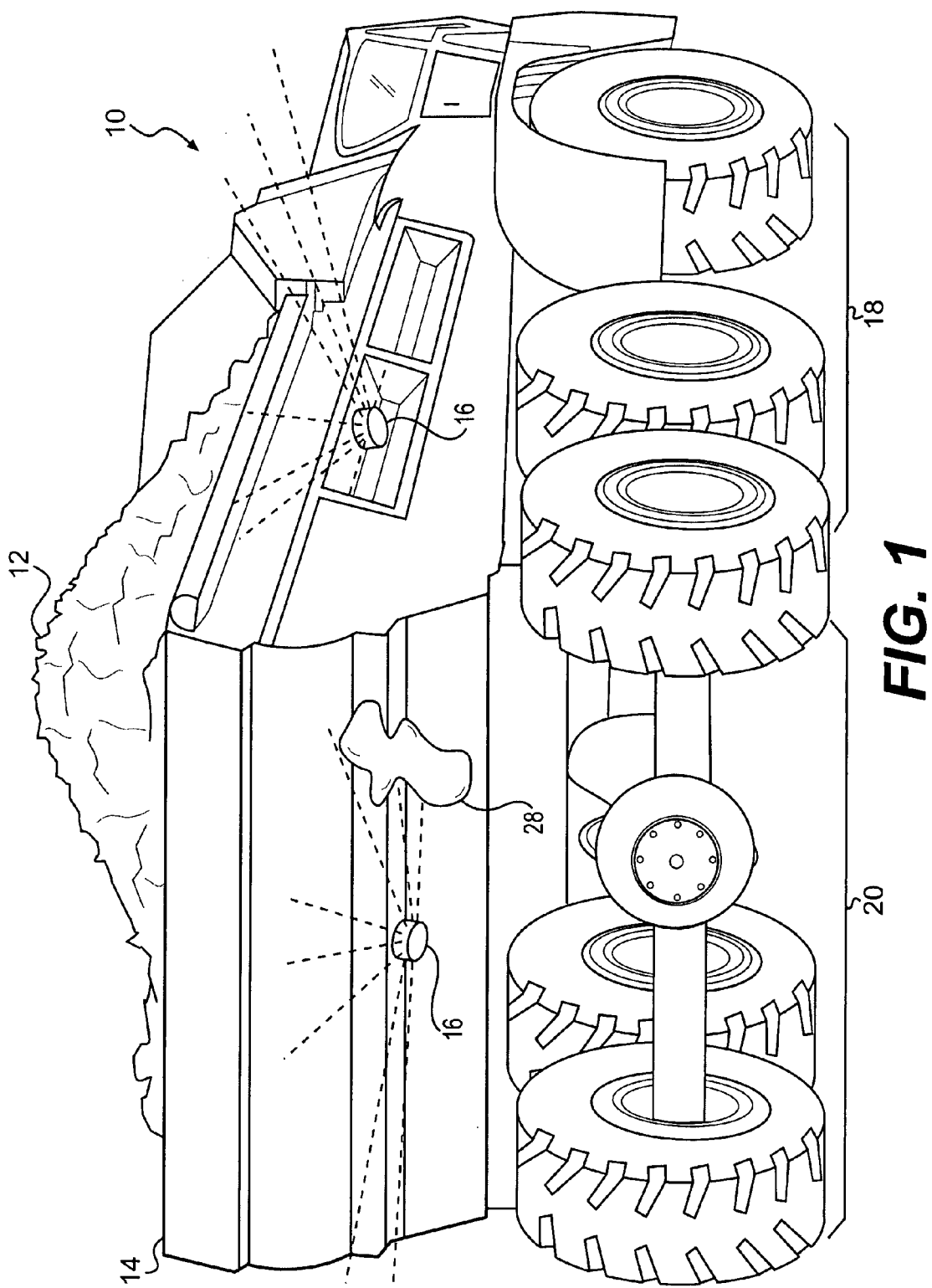
FIG. 1 is a pictorial illustration of an exemplary disclosed machine.

FIG. 1 illustrates an exemplary machine 10 transporting a load material 12. Machine 10 may embody a mobile machine that performs some type of hauling operation associated with an industry such as mining, construction, farming, freighting, or any other industry. For example, machine 10 may be an on or off-highway haul truck, a barge or cargo ship, a railway car, or any other type of heavy equipment which may haul load material 12.

Load material 12 may embody a quantity of material that is large, awkward, loose, heavy, valuable, dangerous, or possessing any other attribute making knowledge of its loss desirable. For example, load material 12 may be scrap, lumber, rock, ore, garbage, precious metal, or any other similar material. As illustrated in FIG. 1, load material 12 may be supported and retained by a container 14 of machine 10.

Container 14 may embody any partially or fully enclosed structure temporarily or permanently attached to machine 10 that can be used to support and retain load material 12. For example, container 14 may be an open bed without sides, a flat-floor bed with one or more sides, a dual-slope bed with one or more sides, a van, a reefer, or any other partially or fully enclosed structure, which may support and retain load material 12.

One or more sensors 16 may be attached to machine 10 and situated to detect material lost from container 14. Sensor 16 may be attached to a side 18 of container 14, a rear portion 20 of container 14, or any other surface of container 14 or machine 10, to detect material lost from container 14. Each sensor 16 may embody a device that detects and ranges objects. For example, sensor 16 may be a LIDAR (light detection and ranging), RADAR, (radio detection and ranging), SONAR (sound navigation and ranging), or any other type of device which may detect and range objects.

Figure 2:
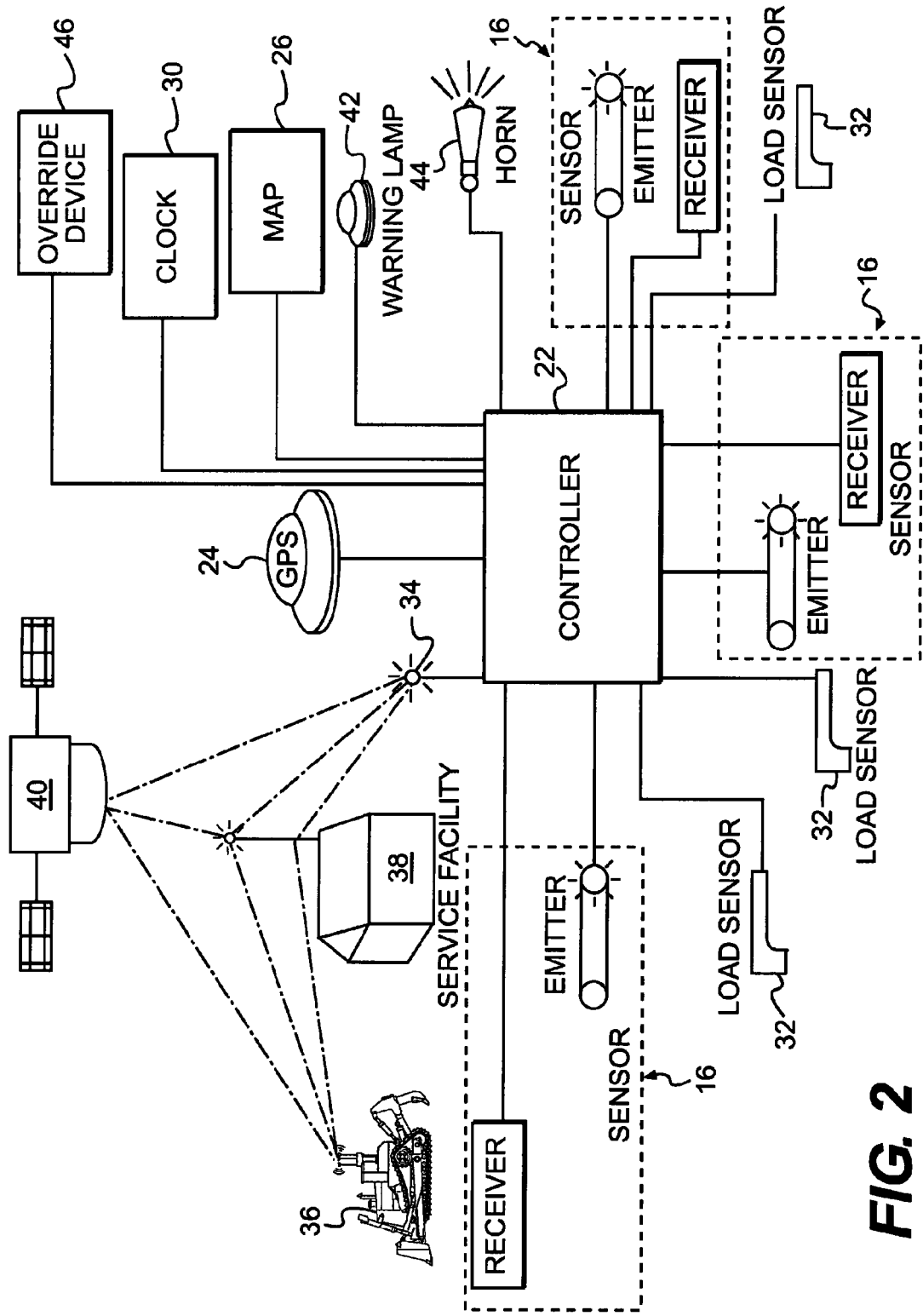
FIG. 2 is a diagrammatic illustration of an exemplary disclosed control system for use with the machine of FIG. 1.

An exemplary sensor 16 is illustrated in FIG. 2, and includes an emitter, which may emit a detection beam, and a receiver, which may receive the detection beam. The emitter may vary the direction of an emitted detection beam so it repeatedly traverses a set of predetermined angles forming a field of detection. The receiver may locate the angle and range the distance of objects within the field by analyzing the angle and time at which it receives detection beams. Sensor 16 may then generate a signal corresponding to the detection and location of objects within the field of detection, which sensor 16 may communicate to a controller 22.

Controller 22 may analyze the signal generated by a sensor 16. Controller 22 may determine a detected object is lost load material 28. If necessary, controller 22 may signal additional devices to collect further information regarding lost load material 28. For example, a locating device 24 and a map 26 may together relate lost load material 28 to the geographical location of its loss. A clock device 30 may relate lost load material 28 to the time and date of its loss. A load sensor 32 may refine controller calculations of the amount of lost load material 28. Controller 22 may also activate warning devices and transmit data to other machines and/or systems, based on information collected regarding lost load material 28. For example, an operator warning device 42 may be activated to warn an operator of a potential lost load; an external warning device 44 may be activated to warn machine 10's immediate vicinity of a potential lost load; and a transmission device 34 may be used to transmit a warning of a potential lost load to another machine, or a request for maintenance to service facility.

Controller 22, attached to machine 10, may include means for monitoring, recording, storing, indexing, processing, and/or communicating and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Controller 22 may receive the signal from sensor 16 and analyze it to determine the presence of unexpected objects. Specifically, controller 22 may convert the signal generated by sensor 16 into a function (hereafter "the generated function") representing the location of surface points of objects on or near machine 10 at regular time intervals. Controller 22 may automatically compare the generated function to a stored function representing the location of expected surface points, for example, the sides of container 14, or another part of machine 10. By this comparison (hereafter "the comparison of functions"), controller 22 may determine the presence of an unexpected object when the functions are not equivalent. For example, the unexpected object might be a lost load material 28, an open door, or an improperly located machine 10 part.

Controller 22 may further analyze the comparison of functions to determine additional information about the unexpected object. Where the two functions are not equivalent, the generated function may represent the location of points on the surface of lost load material 28 at certain discrete time intervals. Together, these surface points and time intervals may allow controller 22 to calculate the amount of lost load material 28. If this amount reaches some critical threshold, controller 22 may determine the detection of lost load material 28 is sufficient to warrant further analysis and/or other additional actions.

Locating device 24 may be associated with sensor 16, controller 22, and map 26 to determine a geographical position of lost load material 28 relative to a local reference point, a coordinate system associated with the work site, a coordinate system associated with Earth, or any other type of 2-D or 3-D coordinate system. For example, locating device 24 may embody an electronic receiver configured to communicate with one or more satellites, or a local radio or laser transmitting system to determine a relative geographical location of itself. Locating device 24 may receive and analyze high-frequency, low power radio or laser signals from multiple locations to triangulate a relative 3-D geographical position. A signal indicative of this geographical position may then be communicated from locating device 24 to controller 22. Alternatively, locating device 24 may embody an Inertial Reference Unit (IRU), odometric or dead-reckoning positioning device, or any other known locating device operable to receive or determine geographical positional information associated with machine 10.

Map 26, electronic in form, may be stored in the memory of controller 22. Map 26 may be updated in real time to reflect the location of a lost load. It may also be used to reroute machine 10 or any other machine to avoid a potentially hazardous lost load material 28. Alternatively, map 26 may be stored in an offboard system, which may be continually referenced and updated by any machine functioning within a certain geographical area (i.e. within a common worksite).

Clock device 30 may be associated with sensor 16 and controller 22 to determine the time position when container 14 ceases to retain load material 28 relative to Greenwich Mean Time, the Julian Day, or any other type of time measuring system. For example, clock device 30 may embody a quartz oscillator, an electronic receiver configured to communicate with a clock system, or any other device operable to receive or determine time positional information associated with machine 10. A signal indicative of this time position may then be communicated from clock device 30 to controller 22.

Load sensor 32 may be associated with controller 22 to calculate, with additional accuracy, the amount of lost load material 28. For example, load sensor 32 may embody a load cell, a force gauge, a pressure sensor, or any other sensor operable to determine the amount of material container 14 is retaining. One or more load sensors 32 may be attached to machine 10 between machine 10's frame and container 14 to account for possible shifting of load material 12 within container 14. The aggregate load weight measured by all sensors 32 may then be converted to a signal indicative of the amount of remaining load material 12. This signal may then be communicated from load sensors 32 to controller 22. Controller 22 may then subtract the current amount of load material 12 from an earlier measured and stored amount of load material 12, the difference representing the amount of lost load material 28.

Transmission device 34 may be associated with controller 22 to transmit and/or receive data, warnings, and/or instructions through a communications link to another machine 36, a service facility 38, a satellite 40, or any other offboard system, based on the signal generated by sensor 16, locating device 24, clock device 30, load sensor 32, or any other onboard and/or offboard device. Transmission device 34 may include hardware and/or software that enables transmission device 34 to send and/or receive data messages through a communication link. The communications may include satellite, cellular, infrared, radio, and any other type of wireless communications that enables transmission device 34 to wirelessly exchange information with offboard systems. Alternatively, the communications may include electrical, optical, or any other type of wired communications that enables transmission device 34 to exchange information with offboard systems.

An operator warning device 42 may be associated with controller 22 and situated to alert a machine operator of lost load material 28. Means of alert may include generating sound, light, smell, or any other change to working conditions detectable by a machine operator. For example, operator warning device 42 may embody a warning lamp; alarm; horn; head-up display; odorant or tissue-irritating substance dispenser; or any other device operable to warn a machine operator of lost load material 28.

An external warning device 44 may, alternatively or additionally, be associated with controller 22 and situated to alert the immediate vicinity of machine 10 to lost load material 28. Means of alert may include generating sound, light, smell, or any other change to environment detectable by living things. For example, external warning device 44 may embody a warning lamp, alarm, horn, chemical repellent dispenser, or any other device operable to warn a living thing of lost load material 28.

An override device 46 may be associated with controller 22 and situated to provide a machine operator a means of interfacing with the automated lost load response system, allowing alterations to the systems function. For example, override device 46 may embody a foot pedal, joystick controller, lever, switch, button, wheel, or any other interface device known in the art, and it may be used to disable, enable, or otherwise alter the functioning of the automated lost load response system.

INDUSTRIAL APPLICABILITY

The disclosed methods and systems may be useful for tasks involving the transportation of large, awkward, loose, and/or heavy loads. They may provide ways to detect information about lost load material 28 and transmit and/or report this information to interested persons and/or other systems. In particular, one disclosed method and system may be used to detect when material is lost from container 14 and warn an operator or the immediate vicinity of the loss.

The disclosed system may, based on the signal generated by sensor 16, and the processing of controller 22, generate a function representing the location of surface points of objects on or near machine 10 at regular time intervals. Controller 22 may automatically compare this generated function to a stored function corresponding to expected surface points, for example, container 14, or another part of machine 10. By this comparison, controller 22 may determine the presence of an unexpected object, for example, a lost load material 28, an open door, or an improperly located machine 10 part. Controller 22 may then activate operator warning device 42 to warn an operator of the object. Alternatively or additionally, controller 22 may then activate external warning device 44 to warn people or other machines in the vicinity of machine 10 about the object.

The disclosed system may also determine additional information about the object, machine 10, and the environment to allow for efficient and appropriate handling of the situation by controller 22, another system, or service facility 38. Additional information may include, for example, object type, amount, time and speed of movement, or location; machine diagnostic data; or any other information that may be useful to persons or systems responding to the situation. Controller 22 may then use this information to respond appropriately to the situation by, for example, notifying service facility 38 or another machine 36 of the location and amount of lost load material 28; notifying service facility 38 of required machine or environmental maintenance; or notifying an operator to inspect and/or act upon machine 10 in some way. Persons or other systems may then efficiently arrange for cleanup, salvage, or repair necessitated by the lost load.

The disclosed system may, when determining the presence of an unexpected object, interface with additional onboard or offboard sensors to determine additional information. For example, controller 22 may, based on the signal generated by a load sensor 32 and the comparison of functions, determine whether the unexpected object is a part of machine 10, a lost load material 28, or a foreign object. If there is a change in the weight of container 14 (filled with load material 12), then controller 22 may determine a lost load material 28 or a part of machine 10 has been lost and record or buffer this information in preparation for transmission. Additionally, based on the signal generated by a load sensor 32, controller 22 may determine and then store or buffer in preparation for transmission the weight of the object lost. But, if there is no change in the weight of container 14 (filled with load material 12), then controller 22 may determine that the object is an improperly located machine 10 part or foreign object and then store or buffer this determination in preparation for transmission.

Regardless of whether controller 22 identifies the unexpected object, controller 22 may determine when and where the unexpected object is detected. Based on the comparison function and the signal generated by clock device 30, controller 22 may correlate the unexpected object's presence with a time location. And based on the comparison function and the signal generated by locating device 24, controller 22 may correlate the unexpected object's presence with a geographical location. Controller 22 may then store or buffer in preparation for transmission either or both locations.

Controller 22 may also interface with other onboard or offboard systems to determine further information about the unexpected object. For example, controller 22 may correlate the unexpected object with information regarding weather, machine diagnostic data, operator maintained data regarding qualities of the transported load material 12, or any other desirable information.

Sometimes, it may be necessary to disable the disclosed system, for example, to load or unload machine 10. Therefore, based on a signal generated by override device 46, controller 22 may temporarily prevent transmission of maintenance requests and activation of warning devices. Alternatively, based on information from other onboard or offboard systems, controller 22 may, without interfacing with an operator, temporarily prevent transmission of maintenance requests and activation of warning devices.

The disclosed system may continue to function regardless of container 14's integrity, allowing detection of material lost through designed or purposeful container 14 openings including open tops, sides, hatches, doors, and any other designed or purposeful opening. Additionally, the disclosed system may allow for an accurate determination of the amount of a lost load material 28 regardless of machine 10's working environment and load material 28's makeup. And, this determination may be suppressed when an operator has reason to know it is faulty, for example, when the operator has purposefully abandoned part of machine 10 to prevent greater harm.

The disclosed system may transmit information about lost load material 28 to a service facility 38, which may then arrange for cleanup, salvage, or repair necessitated by the lost load. Furthermore, the system's constant monitoring of potential lost loads and its ability to warn other machines, and the machine's immediate vicinity, of lost load material 28, may allow machines and/or persons to avoid the geographical location of the lost load, thus preventing possible serious damage and/or injury.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A load response system for a truck comprising:
an open top container supported by the truck to retain material;
a sensor situated on a side of the container and directed towards the open top to detect material that is lost from the container and generate a corresponding signal; and
a controller in communication with the sensor and configured to provide a load loss warning based on the signal.

2. The load response system of claim 1, further including a locating device configured to determine a geographical location of the truck, wherein the controller is in further communication with the locating device and configured to relate the lost material to the geographical location of the loss.

3. The load response system of claim 1, wherein the controller is configured to relate the lost material to a time and date of the loss.

4. The load response system of claim 1, wherein the controller is further configured to calculate an amount of material lost based on the signal.

5. The load response system of claim 4, further including at least one load sensor configured to generate a load signal indicative of an amount of material within the container, wherein the controller is in further communication with the load sensor and the amount of material lost is calculated based further on the load signal.

6. The load response system of claim 1, further including a transmission device, wherein the controller is in further communication with the transmission device and configured to transmit the load loss warning to another truck based on the signal.

7. The load response system of claim 1, further including a transmission device, wherein the controller is in further communication with the transmission device and configured to transmit a maintenance request to a service facility based on the signal.

8. The load response system of claim 7, wherein the maintenance request is based on potential truck damage caused by the lost material.

9. The load response system of claim 7, wherein the maintenance request is based on potential damage to the environment.

10. The load response system of claim 1, wherein the sensor includes:
an emitter to emit a beam; and
a receiver situated to receive the beam and generate the corresponding signal.

11. The load response system of claim 1, wherein the sensor is located on a back side of the container and is configured to detect material that is lost while the container is intact.

12. The load response system of claim 1, further including an operator warning device, wherein the controller is in further communication with the operator warning device and configured to activate the operator warning device based on the signal.

13. The load response system of claim 1, further including an external warning device, wherein the controller is in further communication with the external warning device and configured to activate the external warning device based on the signal.

14. The load response system of claim 1, further including an override device configured to generate an intent signal indicative of an operator's intent to alter an amount of material retained by the container, wherein the controller is in further communication with the override device and configured to prevent transmission of the potential load loss warning, in response to the intent signal.

15. A method of responding to a load lost from a truck, comprising:
emitting a detection beam from a side of a container of the truck towards an open top of the container;
detecting an irregular reflection of the beam; and
determining if the truck has lost at least a portion of its load based on the detection.

16. The method of claim 15, further including determining a geographical location where the load is lost.

17. The method of claim 15, further including determining a time and date when the load is lost.

18. The method of claim 15, further including calculating an amount of the load lost.

19. The method of claim 15, further including transmitting, in response to a determination that load is lost, at least one of:
a warning to another truck of the lost load;
a warning to a truck operator of the lost load; and
a maintenance request to a service facility.

20. A machine, comprising:
an engine;
a container including an open top, the container configured to hold loose material;
a frame operatively connecting the engine and the container;
a sensor attached to an external side of the container, including:
an emitter to emit a plurality of beams toward the top of the container; and
a receiver situated to receive one or more of the plurality of beams and configured to generate a corresponding signal; and
a controller in communication with the machine and the sensor, the controller configured to provide a warning that material has been lost from the container based on the signal.

* * * * *